(12) United States Patent
Berger

(10) Patent No.: US 7,794,154 B2
(45) Date of Patent: Sep. 14, 2010

(54) PLUG CONNECTOR FOR AN OPTICAL FIBRE WITH DEVICE FOR COMPENSATION OF ELONGATIONS OF AN OPTICAL FIBRE

(76) Inventor: Roland Berger, Forstenrieder-Park-Str. 19, Buchendorf/Gauting (DE) 82131

( * ) Notice: Subject to any disclaimer, the term of this patent is extended or adjusted under 35 U.S.C. 154(b) by 0 days.

(21) Appl. No.: 12/300,767

(22) PCT Filed: May 3, 2007

(86) PCT No.: PCT/DE2007/000789

§ 371 (c)(1),
(2), (4) Date: Nov. 13, 2008

(87) PCT Pub. No.: WO2007/131471

PCT Pub. Date: Nov. 22, 2007

(65) Prior Publication Data

US 2009/0245733 A1    Oct. 1, 2009

(30) Foreign Application Priority Data

May 16, 2006    (DE) .................. 10 2006 062 695

(51) Int. Cl.
*G02B 6/36* (2006.01)
(52) U.S. Cl. .......................... 385/77; 385/70
(58) Field of Classification Search ............ 385/53
See application file for complete search history.

(56) References Cited

U.S. PATENT DOCUMENTS

| | | | | |
|---|---|---|---|---|
| 3,792,284 A | * | 2/1974 | Kaelin | 250/551 |
| 3,871,744 A | * | 3/1975 | Bridger et al. | 385/84 |
| 3,883,681 A | * | 5/1975 | Campbell | 174/669 |
| 4,007,704 A | * | 2/1977 | Haviland | 118/701 |
| 4,039,248 A | * | 8/1977 | Franke et al. | 385/111 |
| 4,097,129 A | * | 6/1978 | Wellington et al. | 385/70 |
| 4,148,559 A | * | 4/1979 | Gauthier | 385/55 |
| 4,167,304 A | * | 9/1979 | Gelbke | 385/60 |
| 4,171,867 A | * | 10/1979 | Cocito | 385/135 |
| 4,218,113 A | * | 8/1980 | Uberbacher | 385/72 |
| 4,255,015 A | * | 3/1981 | Adams et al. | 385/90 |
| 4,258,977 A | * | 3/1981 | Lukas et al. | 385/60 |
| 4,309,071 A | * | 1/1982 | Prunier | 385/60 |

(Continued)

FOREIGN PATENT DOCUMENTS

DE    39 00 021 A1    10/1990

(Continued)

*Primary Examiner*—Charlie Peng
*Assistant Examiner*—Peter Radkowski
(74) *Attorney, Agent, or Firm*—Bacon & Thomas, PLLC

(57) ABSTRACT

Plug connector for an optical fiber, provided with a housing (15a, 15b, 9), in which at least two sleeves (10, 13) are located, the first sleeve (10) being fixed to a first housing part (15a) and the second sleeve (13) being fixed to a second housing part (15b), the first sleeve (10) engaging with a cladding (B) on the optical fiber and the second sleeve (13) engaging with a jacket (D) of the optical fiber, wherein, between the sleeves (10, 13), a length (Z) of the optical fiber is defined, in which the optical fiber is provided with the jacket (D), the curvature of the optical fiber may change in this region and the jacket can be displaced in the axial direction relative to the cladding (B) and the sleeve (10) in this region.

5 Claims, 3 Drawing Sheets

U.S. PATENT DOCUMENTS

| | | | |
|---|---|---|---|
| 4,373,777 A | | 2/1983 | Borsuk et al. |
| 4,784,455 A | * | 11/1988 | Sladen et al. .................. 385/87 |
| 4,812,009 A | * | 3/1989 | Carlisle et al. ................. 385/62 |
| 4,846,544 A | * | 7/1989 | Bortolin et al. ............... 385/84 |
| 4,934,785 A | * | 6/1990 | Mathis et al. .................. 385/68 |
| 5,007,704 A | | 4/1991 | McCartney |
| 5,210,810 A | * | 5/1993 | Darden et al. ................. 385/78 |
| 5,233,677 A | * | 8/1993 | Winslow ....................... 385/89 |
| RE35,935 E | * | 10/1998 | Cabato et al. .................. 385/87 |
| 6,913,394 B2 | * | 7/2005 | Iwano et al. .................. 385/78 |
| 7,637,673 B2 | * | 12/2009 | Oike et al. .................... 385/98 |

FOREIGN PATENT DOCUMENTS

| | | | |
|---|---|---|---|
| DE | 3900021 A1 | * | 10/1990 |
| DE | 44 12 571 C1 | | 6/1995 |
| DE | 44 43 200 C1 | | 6/1996 |
| DE | 100 33 785 A1 | | 1/2002 |
| EP | 0 131 742 A1 | | 1/1985 |
| JP | 58-106513 | | 6/1983 |
| JP | 58106513 A | * | 6/1983 |

* cited by examiner

PLUG CONNECTOR FOR AN OPTICAL FIBRE WITH DEVICE FOR COMPENSATION OF ELONGATIONS OF AN OPTICAL FIBRE

FIELD OF THE INVENTION

The present invention relates to a plug connector for an optical fiber, which has a cable strain relief and is in particular suited for optical fibers which are intended for transmitting laser radiation.

PRIOR ART

Plug connectors for optical fibers are known in the most various forms. DE 44 43 200 C1 or DE 44 12 571 C1, for instance, disclose a plug connector which, with a gentle deflection of the at least one optical fiber (LWL), also offers a cable strain relief for the latter. The strain relief is established here by sharp-edged spikes which are provided at the cable inlet in the upper region of the plug and engage the cable envelope of the optical fiber. A silicone spring is provided so as to allow an axial movement of the optical fiber; this, however, is not explained in further detail. It is only to be seen that the cable entering the plug can move freely in a space provided for this purpose. A relative movement between the core fiber (together with the cladding) and the covering is not mentioned. Moreover, the illustrated plug connector is intended for transmitting optical signals with low power levels, meaning that any warming of the cable section and of the plug connector due to the transmitted beam energy can be neglected.

EP 0 131 742 A2 shows an optical fiber which is firmly connected (glued) to a sleeve. In all the embodiments which are shown, a sleeve 14 and/or an adhesive 16 does not engage the optical fiber itself but a silicone cladding 10.

DE 31 39 828 A1 describes a plug connector for a light conducting cable, including an axially movable supporting of the ends of light conductors in the bushing carrier of a plug connector. The light conductors can give way according to the axial movement by their spiral arrangement in a free space in the plug housing. Here too, the light conductor can give way as a whole.

U.S. Pat. No. 3,871,744, which is considered as the most relevant prior art, shows a plug connector for an optical fiber in which a curvature is produced in a "bared" part of the optical fiber. Apart from the fact that producing such a curvature in the unprotected part of the fiber has an extremely unfavorable effect on the durability of the fiber, this curved portion can only have the function to assume a slightly larger curvature or to straighten to a somewhat larger extent in order to accommodate expansions which are due to mechanic or thermal influences.

None of the above-mentioned references refers to the use of the various optical fibers for the transmission of laser radiation.

A beam energy in the kilowatt range exists with the transmission of radiation with high energy (for instance with the transmission of laser radiation from a beam source to a work station). This energy is guided through an optical fiber which typically has diameters ranging from 300 μm to 600 μm. An optical fiber essentially consists of a core fiber (core) and a surrounding covering (cladding), which both are made of quartz glass. A silicone mass adjoins to the latter, and in many cases a plastic sheathing is used as the outermost layer. The beam normally runs in the core fiber; in case the radiation is not centrally in the core, an energy input into the cladding occurs. The warming which is attributed to the high transmission energy causes different elongations of the materials which are involved. When an optical fiber heats up, the outer covering will expand much more than the core and the sheathing which both are made of quartz glass, entailing big problems mainly with plug connectors. Variations of the air humidity can result in a different expansion behavior due to a minimal "swelling" of the plastic materials, too. The expansion behavior of the involved materials may differ as much as up to the factor 80.

It is therefore the object of the invention to provide a plug connector for an optical fiber, which does not only have a strain relief for the delicate optical fiber cable, but also the possibility of compensating the elongations of the various materials.

DETAILED DESCRIPTION OF THE INVENTION

Figure 1:
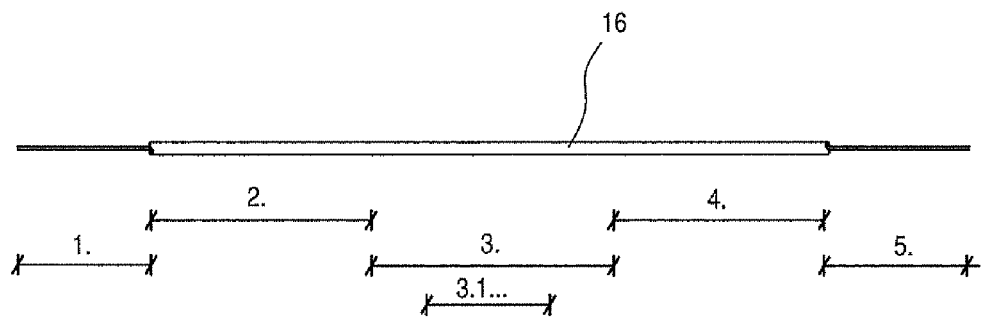
FIG. 1 schematically shows a transmission path for radiation energy, comprising an inlet and an outlet for the radiation.

FIG. 1 shows, in a strongly schematic form, a transmission path for radiation energy. It is to be assumed that in region 1 an optical fiber cable 16 is present, leaving a beam source such as a solid-state laser. It should be clear that the optical fibers which are considered here are suited for the transmission of such kind of radiation and accordingly operate with low losses. Examples for solid-state lasers in question are YAG lasers and excimer lasers. The specific construction of the actual optical fiber made of a quartz core and a quartz covering is not essential for the invention and will therefore not be explained in detail.

Figure 2:
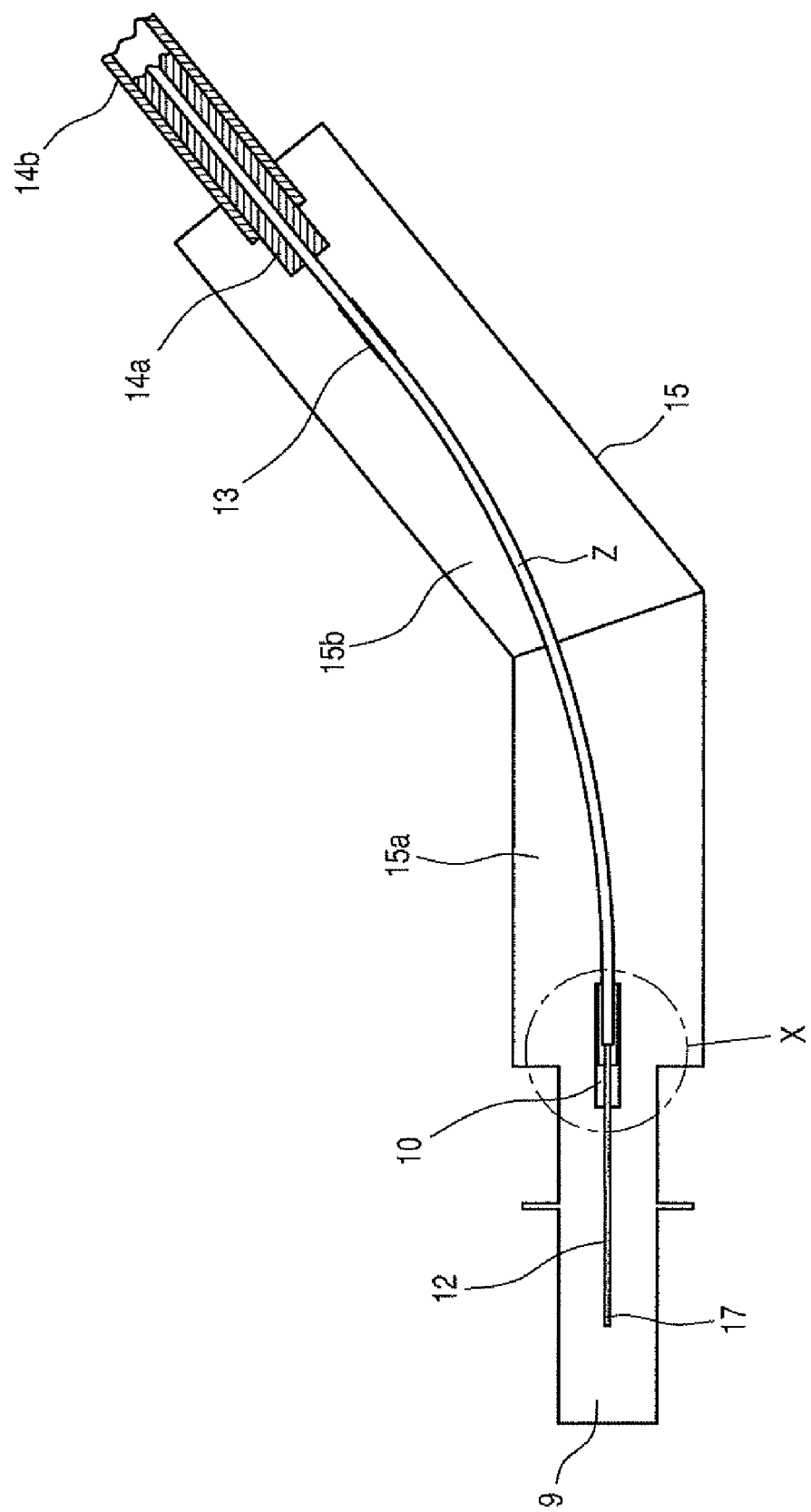
FIG. 2 shows a plug connector according to the invention.

At the transition between regions 1 and 2 a plug connector is provided as it is shown in FIG. 2 and will be described in detail in the following. The regions 2 to 4 which are illustrated in FIG. 1 symbolize a transmission path which can have a length of up to 80 m. In practice one can find lengths of typically 3 to 15 m. Reference will be made below to the subdivision, which has been made in the drawing, of this path into the regions 2 to 4. At the right-hand end of the transmission path shown in FIG. 1, a plug connector such as shown in FIG. 2 is provided again at the transition from region 4 to region 5.

The plug connector illustrated in FIG. 2 essentially consists of a housing 15 of metal and/or plastic, which is divided in two housing portions 15a and 15b. As it is well known by persons skilled in the art, such housings are divided in order to be able to insert an optical fiber.

Provided in this housing is a free space in which the optical fiber can perform slight movements. The movement of the optical fiber occurs here in a region Z. The term "movement" means an alteration of the curvature of the optical fiber which results from a relative displacement between the covering 28 and the core 26 (described in more detail in connection with FIG. 4). The first and second housing parts 15a and 15b form an angle with each other, which preferably is in the range between 90° and 180°. Reference numeral 17 shows a beam input into which, for instance, a laser beam enters which is produced by a radiation source. The foremost end of the optical fiber is "bared", i.e. freed from its covering. Reference numeral 10 designates a first guiding and fastening sleeve for the optical fiber; this sleeve generally consists of high-alloy steel or an aluminum alloy.

Figure 4:
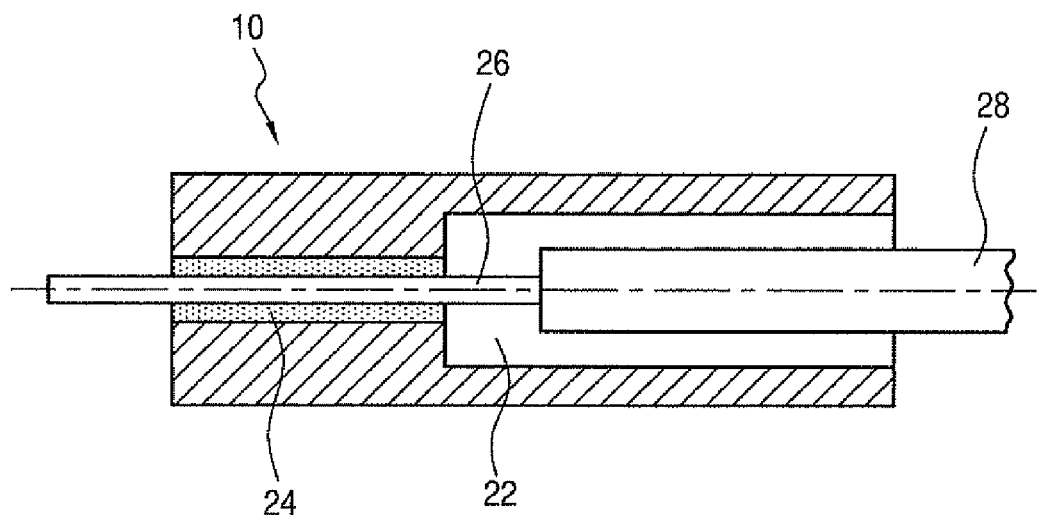
FIG. 4 shows in an enlarged view the region designated with X in FIG. 2.

FIG. 4 shows the construction of the first sleeve 10 and the optical fiber in more detail. The sleeve 10 encloses the optical fiber core and sheathing at the end of the covering 28. The core and the quartz sheathing of the optical fiber are both designated with 26. The first sleeve 10 further has a cavity 22 which surrounds the covering 28 of the optical fiber with a clearance therebetween. Reference numeral 24 designates a high-strength and heat-resistant adhesive as is known in this specific field. This adhesive is used to bond the core 26 of the optical fiber firmly to the sleeve 10 during assembly. The core and the sleeve may also be fastened to one another in any other conventional manner. The sheathing 28, however, is able to move in an axial direction with respect to the core 26 and the sleeve 10, providing a possibility of a length compensation of the covering which exhibits a comparatively large elongation. It has surprisingly been seen that with a suitable dimensioning of the cavity 22 a lateral movement of the optical fiber is permitted without any increased risk of breakage for the core 26.

The first sleeve 10 has a dual function here. One the one hand, it serves for fixing the core 26 (together with the cladding) relative to the end piece 9, and on the other hand it accommodates the elongation of the optical fiber covering. It is a necessary prerequisite for the proper functioning of the optical fiber that the core 17 is centrally located in the end piece 9 at the exact position with high accuracy. As soon as it is glued in the first sleeve 10, the core should not deviate from its assumed position relative to the sleeve 10 any longer. Instead of the sleeve 10 for the longitudinal fixation, it would also be possible to use a prismatic conical element or another optical component of transmitting material, for instance of quartz glass, as a limit stop in longitudinal direction. Reference is made here to the patent document DE 100 33 785 C2 of the present applicant.

Again with reference to FIG. 2, a second sleeve can be seen at 13, which unlike the first sleeve 10 is not adhered to the cladding of the optical fiber, but is firmly glued to the covering 28 or connected with the latter in any other way. The second sleeve 13 again is immovably connected with the second housing part 15b. Known connections include adhesive bonds, clamp connections, screw connections etc. During assembly the second sleeve 13 can be shifted and rotated, this offering an adjustment of the radiation characteristics during assembly (microbending). This second sleeve 13 represents a cable strain relief. The optical fiber, which in the normal case is provided with two protective tubes 14a, 14b, exits the housing part 15b. The protective tube 14a essentially consists of plastic (for instance PA), while the protective tube a sheath 14b can be a metallic protective tube (similar to a Bowden cable). FIG. 2 explains the principle of how a length compensation between the covering and the optical fiber may occur between the two sleeves 10 and 13.

In the cross-section of the optical fiber which is shown on the right in FIG. 2, the actual transmission path begins, which can be as much as 80 m long, as has been described before. At the end of this transmission path another plug is provided, as it is shown in FIG. 2. This second plug is coupled to a working head, for instance, which for cutting, welding, marking, ablating purposes etc. guides the beam energy to the desired position. The construction of the second plug is the same than that of the one shown in FIG. 2: The laser beam travels through the optical fiber and enters the plug housing at the position of the second housing port 15b. At second sleeve 13 the optical fiber is relieved by the cable strain relief. The first sleeve 10 provides for the fixation of the fiber core, and 17 represents the exit point of the laser beam which is exactly held in position relative to the plug 9.

Figure 5:
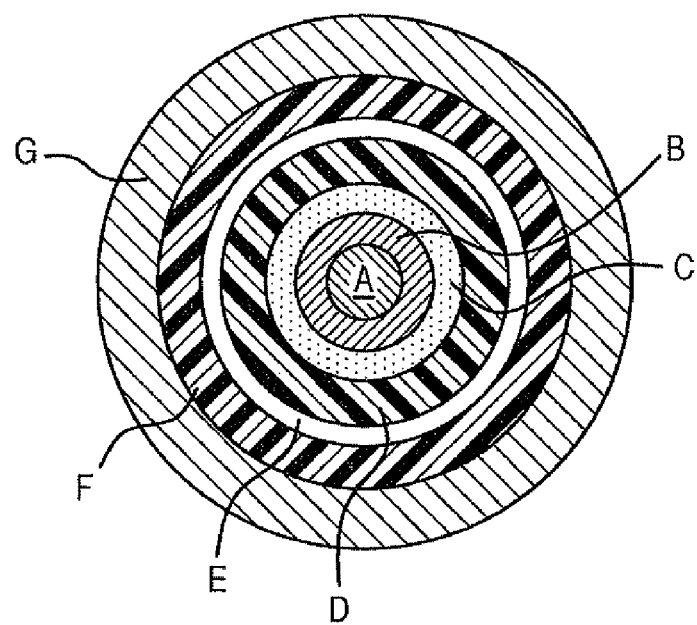
FIG. 5 shows a cross-section through an entire optical fiber in a massive protection design with various protection tubes.

FIG. 5 shows a cross-section through an entire optical fiber with the various coverings. The core fiber A is the element through which the light or laser beam travels. At the interface between core A and cladding B the beam is reflected and in this way is held within the core A. A slight input of energy into the cladding B, however, can never be totally avoided in practical use. The latter is adjoined by a sheathing layer C which is made of a silicone mass. This sheathing layer is followed by a protective tube D which in the most cases consists of nylon/polyamide and is known as "jacket" to professionals. The jacket is surrounded by a further protective tube F of plastic with an air gap E between; the material for the tube F is polyurethane material in the majority of cases. Finally, the outermost layer is a protective metal tube or sheath G which is designed as is the case with a Bowden cable.

Figure 3A:
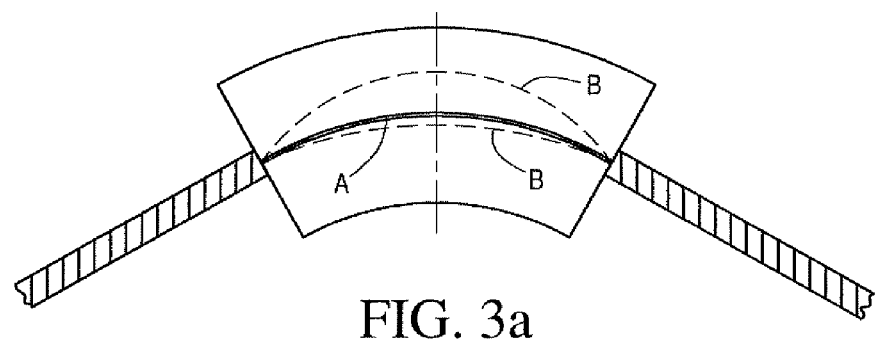
FIGS. 3a and 3b show various ways of compensating the different thermal expansions.
Figure 3B:
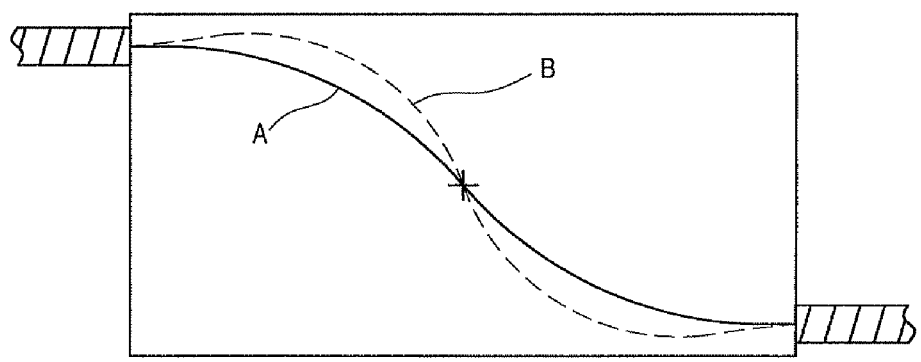

FIGS. 3a and 3b explain a possible run of the optical fiber in a housing of a plug connector analogue to FIG. 2. Between the entry into the plug and the exit therefrom the optical fiber can give way in all axes, i.e. can assume one or more radiuses in all directions of space. In theory, a laying of the optical fiber in the nature of a spiral is also possible.

It is also possible, of course, to subdivide the transmission path into several regions depending on the operating conditions, as is shown in FIG. 1 with the regions 2 to 4. At each transition from region 2 to 3 and region 3 to 4, a plug connector as described in FIG. 3a or 3b may be arranged; here, a length compensation between the jacket and the protective tube of polyurethane can take place, i.e. there is a relative movement between positions D and F. In contrary to this, the plug connector according to FIG. 2 allows a relative movement between positions B and C to D.

The present invention can advantageously also be used in so-called fiber lasers in which the laser beam is directly produced in a waveguide fiber. The merits of the invention will become particularly evident here because fiber lasers reach a high temperature in operation and therefore even larger differing thermal elongations of the fiber materials are to be managed.

The phenomenon of the so-called microbending and the radiation behavior are held constant. This means that any movements and bending actions on the optical fiber with its protective tubes have no effect on the radiation behavior and its mode formation.

The invention claimed is:

1. An optical fiber cable assembly, including an optical fiber cable having an optical fiber core, a cladding adjacent to and fixed with the optical fiber core, and a protective sheathing over the cladding, adapted to constitute a transmission path for laser radiation or other radiation, comprising:
   at least one plug connector including a housing assembly including axially spaced first and second housing parts provided along a cable assembly length;
   first and second sleeves disposed respectively within said first and second housing parts in axially spaced relationship, said first sleeve fixedly connected with the first housing part and the second sleeve fixedly connected with the second housing part;
   said first sleeve fixedly engaging the cladding with the core of the cable assembly and the second sleeve fixedly engaging the sheathing of the cable assembly;

a curved length of the optical fiber cable including at least the core, cladding and sheathing disposed in the housing assembly between the first and second sleeves;

said curved length of the optical fiber cable between the first and second sleeves being unrestricted against variation of the curvature of the length within the housing;

said sheathing being movable axially relative to the first sleeve including the core and cladding engaged with the first sleeve to accommodate variations in relative lengths of the core and cladding relative to the sheathing, such relative movement of the sheathing causing variation in the curvature of said length of the optical fiber assembly.

2. The optical fiber cable assembly according to claim 1, said connector being provided between an entry and exit of the optical fiber cable assembly.

3. The optical fiber cable assembly according to claim 1, wherein said variations of relative lengths include variations induced by changes in temperature and moisture in the area of the optical fiber cable assembly, and said sleeves are arranged to maintain the positions of engagement of the sheathing and cladding with core relative to the housing assembly from changing.

4. The optical fiber assembly according to claim 1, wherein said sheathing extends over the core and cladding over substantially the full length of optical cable assembly disposed between an area of engagement between the first sleeve with the core and cladding, and the area of engagement between the second sleeve and the sheathing.

5. A fiber optical cable connector comprising:

a housing assembly having a housing length and including first and second housing parts disposed in spaced relationship along said housing length;

first and second sleeves disposed respectively within and fixedly connected with said first and second housing parts, said first sleeve fixedly connected with the first housing part and the second sleeve fixedly connected with the second housing part;

said first sleeve adapted for being fixedly connected with a cladding and core of an optical fiber cable extending through the housing assembly and the second sleeve being adapted for being fixedly connected with a sheathing of such optical cable assembly, a curved section of said optical fiber cable extending between said first and second sleeves;

said housing assembly having an open transverse space between said first and second sleeves adapted to accommodate changes in curvature of said curved section of said optical fiber cable disposed within said space.

* * * * *